E. D. DUDLEY.
Flat-Iron Heater.
No. 160,011. Patented Feb. 23, 1875.
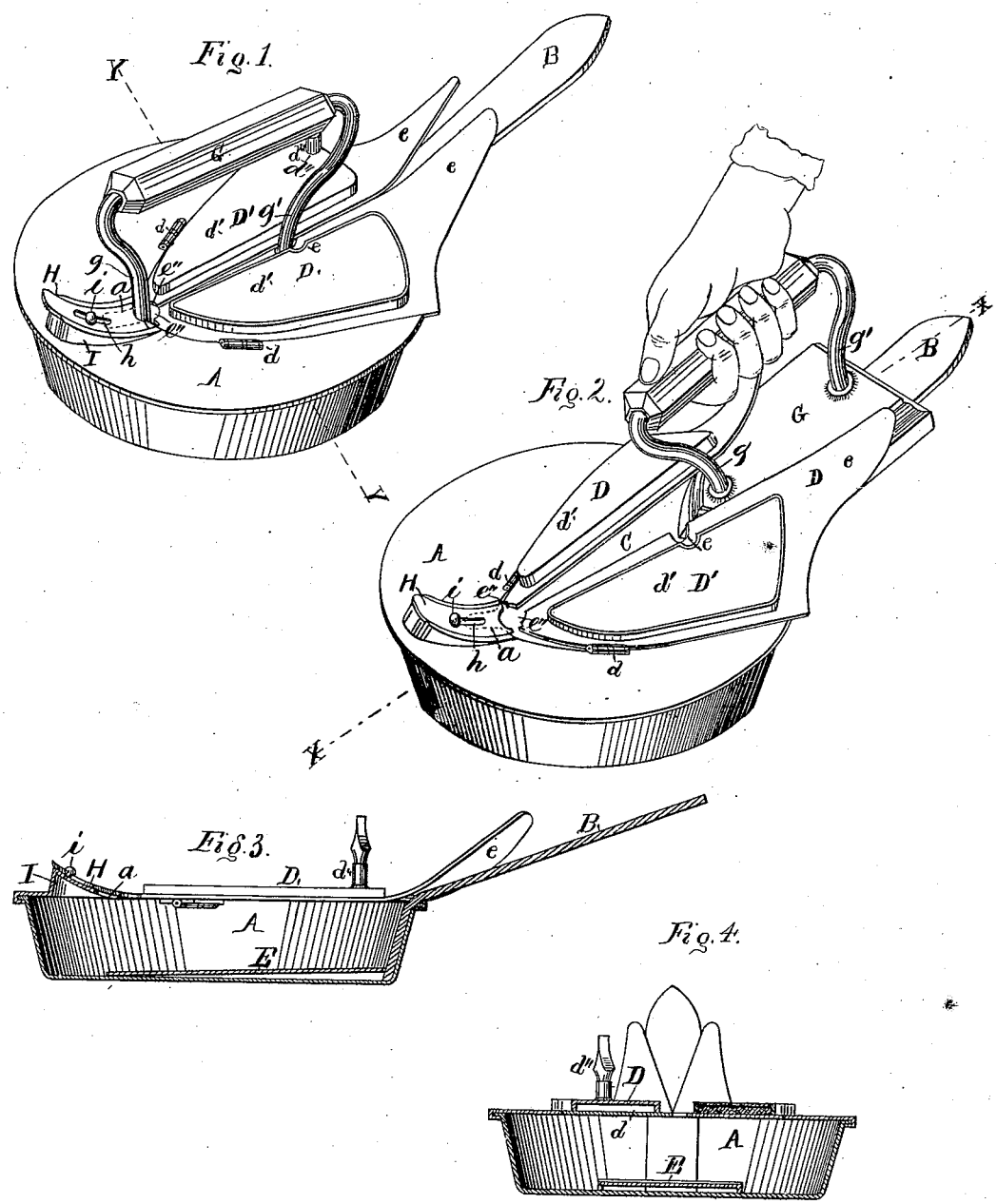
Witnesses.
A. McCallum
D. G. Stuart
Inventor:
Edward D. Dudley,
By W. B. Richards,
Atty.

UNITED STATES PATENT OFFICE.

EDWARD D. DUDLEY, OF GALESBURG, ILLINOIS.

IMPROVEMENT IN FLAT-IRON HEATERS.

Specification forming part of Letters Patent No. 160,011, dated February 23, 1875; application filed January 2, 1875.

*To all whom it may concern:*

Be it known that I, EDWARD D. DUDLEY, of Galesburg, county of Knox and State of Illinois, have invented certain Improvements in Flat-Iron Heaters, of which the following is a specification:

This invention relates to a device in which to heat flat-irons; and it consists in hinging two falling lids upon the heater, in such manner as to admit of the irons being inserted or withdrawn readily and easily, and to form a close-fitting and heat-retaining cover when the iron is inserted; and further consists in the construction of the lids as non-conductors of heat; and further consists in the arrangement, within the pan of supplementary removable bottoms, to adapt it to different-sized irons; and also in the arrangement upon the pan of a gravitating slide for the purpose of adapting the lid-opening to different-sized irons, all as hereinafter fully described.

To enable others skilled in the art to make and use my invention, I will now proceed to describe the same with reference to the accompanying drawing, in which—

Figure 1 is a perspective view of a heater embodying my invention, and showing the upper portion of the handles of a flat-iron contained therein. Fig. 2 is a perspective view, showing the iron being inserted. Fig. 3 is a sectional view in the line $x\ x$ of Fig. 1; and Fig. 4 is a sectional view in the line $y\ y$ of same figure.

Referring to the parts by letters, letters A represent the pan for receiving the iron. It may be constructed circular, as shown in the drawings, or may be made of any desirable shape, which will form chambers for the irons, and will be adapted and fit into the ordinary openings for pots in stoves. B is a handle projecting from one side of the pan A, and its upper side flush with the upper edge of the same. C is a triangular-shaped opening in the top of the pan A, in which are hinged, at $d\ d$, two falling lids, D D', the sides of which fit accurately the opening C, and against each other when closed, and the rear ends of which are formed into lips $e\ e$, which are turned upward, as shown in the drawings, to facilitate entering the iron, as hereinafter described. $e'$ is a semicircular recess in the edge of one of the falling lids, and $e''\ e''$ are similar recesses in the ends of both lids. The lids have compartments $d'$, or are made double and hollow, and may be either filled with plaster-of-paris, as shown at D', or with water, as shown at D, the water-compartment being provided with supply-pipe $d''$. E is a removable plate, placed within the pan A, and on the bottom thereof. G is an ordinary flat-iron. H is a gravitating slide, curved longitudinally, as shown in the drawings, and seated in ways on the upper surface of an incline, I, where it is retained by a loose button, $i$, which passes through a slot, $h$, in said slide H, so as to allow a movement lengthwise thereof. $a$ is a slot in the incline I and pan-top.

The operation is as follows: The pan is placed in one of the openings of the stove. The iron is inserted within the pan by entering its nose end beneath the lips $e$, and pushing it forward, thereby elevating the lids D D', as shown at Fig. 2. The forward part of the iron handle $g$, passing into the slot $a$, and striking the slide H, pressing it forward until the rear side of the handle $g'$ is opposite the recess $e'$, the lid D' will then fall, and the iron being then pushed over to that side the rear side $g'$ of the handle will enter said recess, and allow the lid D to fall into position, as shown at Fig. 1, in which position the lids completely close the opening C, the slide H, by its own gravity, falling back to rest against the forward side of the handle $g$, and completely closing the slot $a$, thus retaining and utilizing the heat and saving fuel.

The operation of withdrawing the iron will be obvious from the foregoing description, as it is nearly a reverse process from entering it.

The non-conductors of heat upon the lids will prevent the heat radiating on the handle of the iron, and protect the hand of the person placing and removing the iron. The projecting handle B not only serves as a handle for the pan A, but also as a guide in entering the iron.

Different-sized plates E may be used, in case of low-handled irons in deeper pans, to raise the irons, so that the vertical parts of the handles will be in proper horizontal plane to allow the lids D D' to operate readily.

I claim—

1. The lids D D', having recesses $e'$ $e''$ and lips $e$ $e$, hinged to the pan A, and arranged to operate in combination therewith, and with the iron G and handle B, substantially as described, and for the purpose specified.

2. The lids D D, provided with non-conductor-of-heat compartment, and arranged to operate in combination with the pan A and iron G, substantially as and for the purpose specified.

3. The gravitating slide H, arranged to operate in combination with the iron G and pan A, substantially as described, and for the purpose specified.

EDWARD D. DUDLEY.

Witnesses:
J. J. TUNNICLIFF,
W. B. RICHARDS.